Jan. 7, 1936.   E. P. FLEMING   2,026,622

ROASTING SULPHIDE ORES

Filed Jan. 31, 1934

INVENTOR
Edward P. Fleming
BY
ATTORNEYS

Patented Jan. 7, 1936

2,026,622

UNITED STATES PATENT OFFICE 2,026,622

ROASTING SULPHIDE ORES

Edward P. Fleming, Salt Lake City, Utah, assignor to American Smelting and Refining Company, New York, N. Y., a corporation of New Jersey Application January 31, 1934, Serial No. 709,107

13 Claims. (Cl. 266—20)

This invention relates to an improved process and apparatus for roasting finely divided sulphide ores such as flotation concentrates and the like.

It is already known procedure to roast sulphide ores by introducing the pulverulent ore and air tangentially near the top of a heated roasting chamber whereby a large part of the sulphur is oxidized before the charge reaches the furnace hearth. In this process, additional air is introduced into the lower portion of the chamber to complete the roasting operation. The gas and fume are withdrawn by a flue opening in the central portion of the chamber, the velocity being sufficiently low to allow dust to settle to the hearth where it is subjected to a rabbling operation. Such process and apparatus are disclosed in my co-pending application, Serial No. 681,062, filed July 19, 1933.

The present invention constitutes an improvement on the invention disclosed in my above mentioned application and provides means for causing an intensified separating action between solids and gases during the roasting process whereby the dust content of the flue gases is substantially reduced.

This invention also relates to an improved method and apparatus for efficient heat utilization, such method and apparatus including means for temperature control of the roasting process.

In accordance with the present invention, the mixture of sulphide ore and air injected into the upper portion of a preheated roasting chamber may be made to follow a spiral path as it descends the roasting chamber and this chamber may be so constructed as to progressively increase the speed of the gases in the descending spiral. By this construction, a much better separation is achieved between the dust particles and the gas. This makes possible more efficient roasting, while substantially decreasing the amount of dust in the flue gas.

The construction of the roasting chamber may preferably include air jackets through which controlled amounts of cool air are passed. The air which becomes heated in these jackets may be used in the drying and air classification of ore concentrates whereby very efficient heat utilization is achieved.

Figure 1:
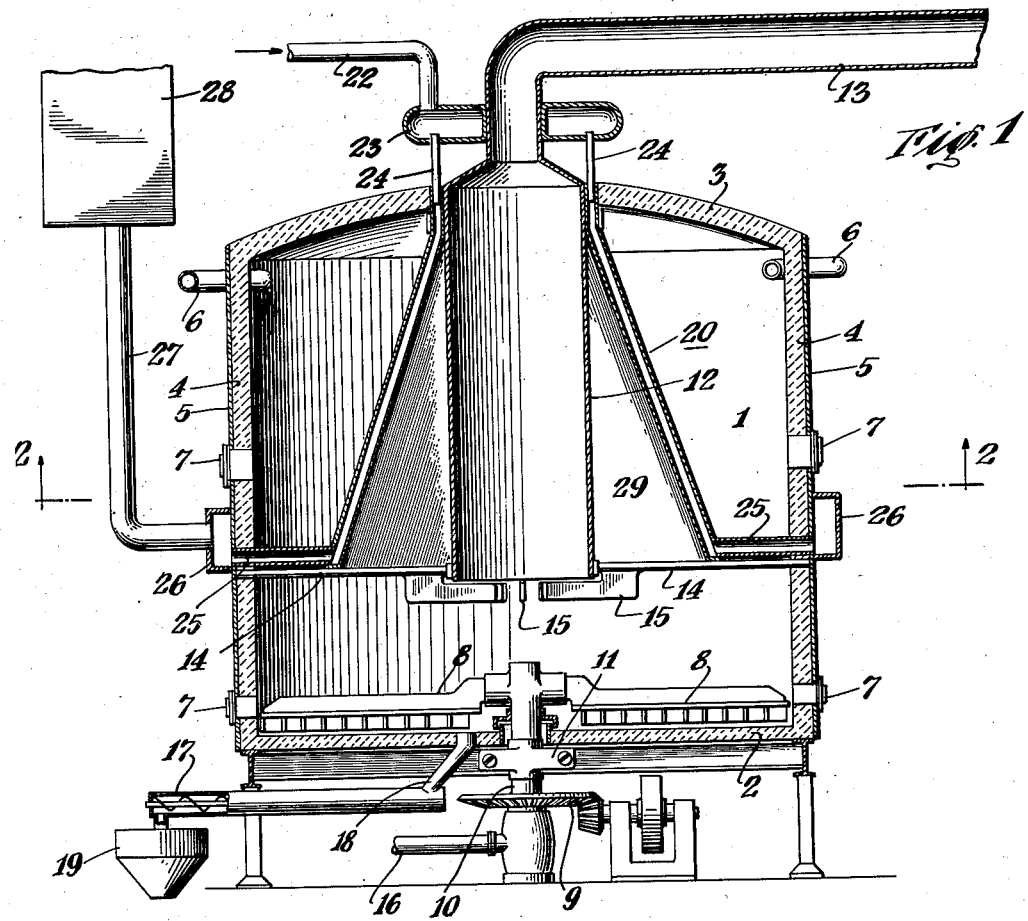
Figure 2:
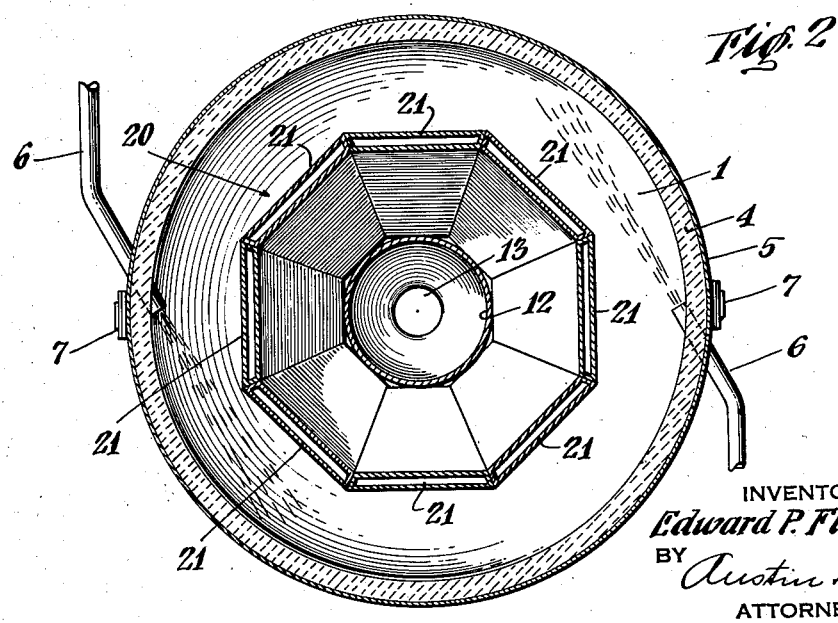

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawing forming a part thereof, in which Fig. 1 is a vertical section of a roasting furnace embodying the principles of the invention; and Fig. 2 is a cross section along the line 2—2 of Fig. 1.

Like reference characters denote like parts in the several figures of the drawing.

In the following description and in the claims, various details will be identified by specific names for convenience, but they are intended to be as generic in their application as the art will permit.

Referring more in detail to the drawing, roasting chamber 1 of a furnace is formed by hearth 2, roof 3 and refractory side walls 4, the latter being surrounded by steel jacket 5. Feed inlets 6 and work doors 7 are provided in walls 4. Air-cooled rabble arms 8 connected with gears 9 by hollow drive shaft 10 enclosed by housing 11 are provided. A central vertical flue 12 extends downwardly through the roof into the lower region of the roasting chamber. These features form no part of the present invention except in combination with the remaining structural features of the invention, as will be apparent.

A jacket 20 consisting of a plurality of double-walled, separable sections 21 surrounds the flue 12. Jacket 20 closely hugs the flue at the top of the furnace and slopes out to a periphery which may be one-half to two-thirds of the distance from the flue wall to the outer furnace wall. The jacket 20 may extend down into the furnace approximately the same distance as flue 12. The jacket 20 is shown in the form of a truncated pyramid but it is obvious that various other forms and dimensions may be used. The jacket may for example, be constructed in the form of a truncated cone. Single-walled jacket sections may be used under certain circumstances where the heat conditions make such use possible.

A cooling air feed pipe 22 supplies air to bustle pipe 23. A valve may preferably be included in pipe 22 for regulating the air supply. A plurality of individual feed pipes 24 connect bustle pipe 23 with the tops of the respective sections 21 of the jacket. Offtake pipes 25 lead the heated gases from the bottom ends of sections 21 to an annular collecting conduit 26 extending around the outside of the furnace. A pipe 27 leads the heated air from conduit 26 to a grinder and air classifier 28. The heated air is here utilized in a well-known manner for final drying and air classification of the ore concentrates.

The jacket 20 and flue 12 are hung from the superstructure of the furnace and are further supported by braces 14 extending in from the side walls of the furnace. Braces 14 may also carry vanes 15 for elimination of eddy currents.

An air supply pipe 16 is fitted to hollow drive shaft 10 of the rabble arms 8. Suitable outlets are provided through which air passed through supply pipe 16 and shaft 10 may enter the roasting chamber 1 in a direction counter-current to the travel of the roasted ore. There is thus established a counter-current roasting zone by introducing additional air into the lower portion of the roasting chamber 1 in counter-current flow to the descending ore particles, thereby establishing a quiescent or neutral zone at the interface of the concurrent and countercurrent zones.

Located beneath the rabble arms 8 is a discharge outlet 18 for roasted material, a conduit 17 connecting the outlet 18 with hopper 19. The material entering outlet 18 drops into the conduit 17 and is conveyed therethrough to the hopper 19 by a screw conveyor operating in the conduit 17.

The general procedure for the roasting of the sulphide ores is described in my above mentioned copending application. The roasting is practiced with the following improvements, however, according to my present invention. The mixed ore and air, tangentially introduced at the top of the roasting chamber, is progressively accelerated as it moves in a downward spiral course due to the progressive narrowing of the chamber area by the jacket 20. Thus, the roasted ore carried in suspension travels at increasing velocities and the centrifugal force which is developed causes the dust particles to move toward the periphery of the chamber and settle very close to the outside wall of the furnace.

Due to the above described centrifugal action, whereby the dust particles settle very close to the outside edge of the hearth 2, a very efficient separation of dust and gases is obtained. As the rabble arms 8 work the calcines to the center of the hearth, the greater part of the calcines will be required to travel the entire distance from the edge to the center of the hearth insuring a maximum amount of roasting.

Much of the dust remaining in the gases after the centrifugal separating action in the roasting chamber will settle out in the relatively quiet area surrounding the flue. The dead air chamber 29 formed between the flue 12 and jacket 20 serves as additional settling space and improves the settling action. Further settling takes place, of course, in the vertical part of the flue wherein the gas velocity is relatively slow. Vanes 15 break up the swirling motion or eddy currents in the gases surrounding the mouth of the flue and the lower part of settling space 29. The relatively dust free flue gases are carried off from the top of the flue by conduit 13.

The metal work within the furnace, such as the flue 12, sections 21 of jacket 20, pipes 25 and braces 14 may preferably be constructed of a high-temperature resistance alloy such as chromium-nickel-steel capable of withstanding temperatures in excess of 1000° C. They may, for example, be constructed of chromium steel, corresponding to Allegheny 44 metal, an alloy which is readily fabricated and will withstand temperatures approaching 1150° C. By the sectional construction of jacket 20, whereby each section is separately removable, a single section may be replaced by a new section should it inadvertently become injured or corroded.

During the roasting operation cold air is passed through the jacket sections 21. The air enters the tops of the sections through the feed pipes 24 fed from bustle pipe 23 which is supplied at a controlled rate from pipe 22. The circulating air absorbs heat from the walls of the sections 21 and passes out through offtake pipes 25 to conduit 26. The cooling action of the air thus keeps the walls of the jacket at a comparatively low temperature whereby they are preserved and kept from disintegration. The heated air is led through pipe 27 to the grinding and air classifying equipment 28 where it may be used for drying the ore concentrates.

It will be apparent from the above description that the present invention results in increased separation of the dust from the furnace gases. The gases leaving the furnace are thereby made remarkably free of dust and further separation requirements are reduced to a minimum. The intensified centrifugal action not only increases the percentage of separation but brings about the deposit of the solids at the extreme edge of the hearth so that the solids will receive a maximum dead roast while being worked to the center by the rabble arms. Furthermore, by providing the additional settling space in what may be termed the "neutral" zone between the down-draft and up-draft zones, a marked decrease in the dust content of the gases is obtained.

The present invention likewise provides for very efficient heat utilization by using the heated air from the jacket sections as a drying agent in another part of the ore treating process. As stated, this air may be used in the classification and drying of the concentrates which are to be fed to the furnace. The hot air from the jacket sections forms an ideal medium for this purpose and thereby contributes to better preparation of these concentrates for efficient flash roasting.

The invention thereby greatly diminishes the dust content in the flue gases and provides hot air for drying and classification.

While certain novel features of the invention have been disclosed and are pointed out in the annexed claims, it will be understood that various omissions, substitutions and changes may be made by those skilled in the art without departing from the spirit of the invention.

What is claimed is:

1. The process of roasting sulphide ore in suspension which comprises tangentially introducing air and said ore into the upper portion of a preheated roasting chamber thereby establishing a concurrent roasting zone, progressively increasing the peripheral velocity of said air and ore as it descends within said chamber thereby to deposit the solids close to the outer periphery of the chamber, establishing a countercurrent roasting zone by introducing additional air into the lower portion of said chamber in countercurrent flow to the descending ore particles thereby establishing a neutral zone at the interface of said concurrent and countercurrent zones and withdrawing the resultant gases from said neutral zone.

2. The process of roasting finely divided sulphide ore which comprises tangentially injecting said ore with sufficient air to partially oxidize same into the upper portion of a preheated roasting chamber, progressively increasing the tangential velocity of said ore and air mixture to cause centrifugal separation thereof, introducing additional air into the lower portion of said chamber in quantities sufficient to complete the oxidation of said ore and withdrawing the resultant gases from the central portion of said chamber at a point intermediate the top and bottom of the roasting chamber.

3. The method of roasting finely divided zinc sulphide ore which comprises tangentially introducing said ore with sufficient air to initiate the roasting operation into the upper portion of a preheated roasting chamber, progressively increasing the tangential velocity of said ore and air mixture to cause centrifugal separation thereof, introducing additional air sufficient to complete the roasting operation into the lower portion of said chamber and withdrawing the resultant gases through a central flue at a point approximately one-half to two-thirds down the shaft of the furnace at a velocity sufficiently low that dust particles are separated from the gases by gravitation.

4. In roasting finely divided sulphide ores in suspension without aid of extraneous fuel, the improvement which consists in passing the gases and suspended ores spirally through the roasting chamber at progressively increasing tangential velocity and withdrawing the gases from the furnace at a central point approximately half way between the top and the bottom of the roasting chamber.

5. In roasting finely divided sulphide ores in suspension without aid of extraneous fuel, the improvement which consists in passing the gases and suspended ores spirally through the roasting chamber at progressively increasing tangential velocity and withdrawing the fume from the furnace through a vertical interior flue at a point intermediate the top and the bottom of the roasting chamber and at a velocity sufficiently low that dust particles separate from the fume by gravity.

6. In an apparatus for roasting sulphide ores, the combination comprising a roasting chamber, means for injecting ore into the upper portion of said chamber, rabbling means positioned above the hearth of said chamber, a vertical offtake flue extending from the roof of said chamber to a point more than half-way down said chamber and a flaring jacket surrounding said flue to form a restricted passage for said ore.

7. Apparatus for roasting finely divided sulphide ores comprising a roasting chamber, means for introducing ore into the upper portion of said chamber, central, flaring means for forcing said ore toward the outer wall of said chamber and means for withdrawing gases from said chamber at a point intermediate the top and the bottom thereof.

8. In combination with a roasting chamber for oxidizing finely divided zinc sulphide ore, a central offtake flue, said flue having an opening intermediate the top and the bottom of said chamber and adapted to remove gases at a velocity sufficiently low to permit dust particles to separate by gravity from gases passing upwardly through said flue and a flaring jacket surrounding said flue to force materials toward the outer wall of said roasting chamber.

9. In a furnace for roasting sulphide ores, a roasting chamber, means for introducing a mixture of ore and air at the top of said chamber and a flaring jacket within said chamber and extending downwardly from the roof thereof to force said ore toward the outer wall of said chamber.

10. In a furnace for roasting sulphide ores, a roasting chamber, means for introducing a mixture of ore and air at the top of said chamber, a double walled flaring jacket within said chamber to force said ore toward the outer wall of said chamber on its downwardly passage therethrough and means for passing a cooling fluid between the double walls of said jacket.

11. In a furnace for roasting finely divided sulphide ores, a roasting chamber, means for introducing a mixture of air and ore tangentially near the top of said chamber, a vertical offtake flue extending from the roof of said chamber to a point intermediate the top and bottom thereof, a double walled flaring jacket on said flue and means for circulating cooling gas through said jacket at a controlled rate of flow.

12. A roasting apparatus comprising the combination with a shell defining a roasting chamber, of means for introducing material to be roasted tangentially into the roasting chamber, and a jacket member in the chamber progressively narrowing the area of the chamber from the top thereof downwardly in the direction of travel of the material for increasing the velocity of travel of the material and for imparting sufficient centrifugal force thereto to enable a separation of material components of different specific gravities.

13. A roasting apparatus comprising the combination with a shell defining a roasting chamber, of means for introducing material to be roasted tangentially into the roasting chamber, a flue positioned in the chamber, a jacket member in the chamber adjacent the flue progressively narrowing the area of the chamber in the direction of travel of the material for increasing the velocity of travel of the material and for imparting sufficient centrifugal force thereto to enable a separation of material components of different specific gravities, and agitating means for effecting continuous rabbling of the material as it passes the jacket member.

EDWARD P. FLEMING.